(12) United States Patent
Matsuno et al.

(10) Patent No.: US 12,509,060 B2
(45) Date of Patent: Dec. 30, 2025

(54) TURNING BEHAVIOR CONTROL DEVICE FOR VEHICLE

(71) Applicants: SUBARU CORPORATION, Tokyo (JP); TOYOTA JIDOSHA KABUSHIKI KAISHA, Aichi-ken (JP)

(72) Inventors: Koji Matsuno, Tokyo (JP); Masahiro Saito, Tokyo (JP); Kojiro Nakajima, Tokyo (JP); Nozomi Kosaka, Tokyo (JP); Goichi Kobayashi, Tokyo (JP); Yoshinori Maeda, Aichi-ken (JP)

(73) Assignees: SUBARU CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 246 days.

(21) Appl. No.: 18/172,655

(22) Filed: Feb. 22, 2023

(65) Prior Publication Data
US 2023/0294667 A1    Sep. 21, 2023

(30) Foreign Application Priority Data
Mar. 16, 2022    (JP) .................................. 2022-041814

(51) Int. Cl.
*B60W 30/045*    (2012.01)
*B60W 10/04*    (2006.01)
*B60W 10/188*    (2012.01)

(52) U.S. Cl.
CPC .......... *B60W 30/045* (2013.01); *B60W 10/04* (2013.01); *B60W 10/188* (2013.01); *B60W 2520/14* (2013.01)

(58) Field of Classification Search
CPC .... B60W 30/045; B60W 30/12; B60W 10/04; B60W 10/188; B60W 10/20;

(Continued)

(56) References Cited

U.S. PATENT DOCUMENTS

2005/0236782 A1* 10/2005 Kobayashi ............. B60G 21/06
  280/6.159
2006/0076740 A1*  4/2006 Sugiyama ................ B60L 7/00
  280/5.502

(Continued)

FOREIGN PATENT DOCUMENTS

JP    2015-151048 A    8/2015
JP    2020-050024 A    4/2020

OTHER PUBLICATIONS

Notice of Reasons for Refusal received in corresponding Japanese Patent Application No. 2022-041814, dated Oct. 14, 2025.

*Primary Examiner* — Andrew R Dyer
(74) *Attorney, Agent, or Firm* — Rimon P.C.

(57) ABSTRACT

A turning behavior control device for a vehicle includes a yaw rate detector, a front wheel suspension, a rear wheel suspension, a brake device, a hydraulic pressure supplier, and a travel controller. The left and right front wheels of the vehicle are steered wheels and drive wheels. The travel controller includes a deviation value calculator configured to calculate a deviation between a standard yaw rate for determining a degree of understeer during turning of the vehicle and a yaw rate detected by the yaw rate detector, and a braking force controller configured to output, to the hydraulic pressure supplier, a first signal for applying braking forces to left and right front wheels in addition to a turning inner rear wheel when it is determined that the deviation calculated by the deviation value calculator exceeds a predetermined deviation reference value.

9 Claims, 8 Drawing Sheets

(58) Field of Classification Search
CPC ..... B60W 2520/14; B60W 2710/0661; B60W 2710/182; B60W 2720/406
USPC .......................................................... 701/41
See application file for complete search history.

(56) References Cited

U.S. PATENT DOCUMENTS

| | | | |
|---|---|---|---|
| 2013/0204503 A1* | 8/2013 | Watanabe | B60T 8/1761 |
| | | | 701/70 |
| 2018/0237003 A1* | 8/2018 | Watanabe | B60W 10/14 |
| 2019/0023263 A1* | 1/2019 | Shoji | B60T 8/1755 |
| 2019/0126976 A1* | 5/2019 | Murayama | B60W 30/18145 |
| 2019/0202440 A1* | 7/2019 | Watanabe | B60W 10/04 |
| 2019/0381980 A1* | 12/2019 | Maruyama | B60T 7/20 |
| 2020/0094797 A1* | 3/2020 | Shoji | B60W 40/076 |
| 2020/0108810 A1* | 4/2020 | Hara | B60T 8/26 |
| 2020/0156624 A1* | 5/2020 | Witte | G05D 1/0077 |
| 2020/0171959 A1* | 6/2020 | Kamino | B60L 15/2009 |
| 2020/0216046 A1* | 7/2020 | Hiraga | B60W 30/02 |
| 2020/0217261 A1* | 7/2020 | Umetsu | F02D 41/3005 |
| 2020/0290596 A1* | 9/2020 | Birch | B60W 10/02 |
| 2021/0139007 A1 | 5/2021 | Wijffels et al. | |
| 2021/0188252 A1* | 6/2021 | Lu | B60W 40/12 |
| 2021/0213935 A1* | 7/2021 | Lu | B60C 23/04 |
| 2022/0063366 A1* | 3/2022 | Minakuchi | B60W 30/02 |
| 2022/0063638 A1* | 3/2022 | Minakuchi | B60W 40/10 |
| 2023/0219542 A1* | 7/2023 | Yamamoto | B60W 20/14 |
| | | | 701/70 |

\* cited by examiner

FIG. 4A
LEFT TURNING

LEFT TURNING

TURNING BEHAVIOR CONTROL DEVICE FOR VEHICLE

CROSS-REFERENCE TO RELATED APPLICATIONS

The present application claims priority from Japanese Patent Application No. 2022-041814 filed on Mar. 16, 2022, the entire contents of which are hereby incorporated by reference.

BACKGROUND

The present disclosure relates to a turning behavior control device for a vehicle for efficiently reducing a degree of understeer occurring in the vehicle at an initial stage when the degree of understeer is high.

In travel trajectory control (also referred to as "lane keeping control") as automatic steering control, when a deviation between a target travel trajectory of a vehicle and an actual travel trajectory of the vehicle increases, steered wheels are steered, and feedback control is performed such that the actual travel trajectory converges to the target travel trajectory. For example, as a degree of understeer acting on the vehicle increases when a turning radius of the actual travel trajectory of the vehicle is larger than a turning radius set as the target travel trajectory and a difference therebetween is large, a steering control device attempts to steer the steered wheels in a turning-increasing direction to correct the turning radius to the turning radius side set as the target travel trajectory.

However, for example, when front wheels are the steered wheel and drive wheels, a ground contact load of a turning inner front wheel decreases due to a load movement in a lateral direction acting on the vehicle along with the turning. Therefore, even when the turning inner front wheel is turned in the turning-increasing direction, a lateral force of the turning inner front wheel does not increase sufficiently, and a necessary yaw moment cannot be applied to the vehicle. As a result, it is difficult to converge the actual travel trajectory of the vehicle to the target travel trajectory.

As a countermeasure against this, for example, Japanese Unexamined Patent Application Publication (JP-A) No. 2020-050024 discloses a technique in which, when a deviation between a standard yaw rate (target yaw rate) of a vehicle and an actual yaw rate exceeds a predetermined deviation reference value and a time change rate of the deviation exceeds a start reference value during turning, a braking force is applied to a turning inner drive wheel and a load movement from a turning outer drive wheel to the turning inner drive wheel is generated, thereby increasing a ground contact load of the turning inner drive wheel.

SUMMARY

An aspect of the present disclosure provides a turning behavior control device for a vehicle. The turning behavior control device includes a yaw rate detector, a front wheel suspension, a rear wheel suspension, a brake device, a hydraulic pressure supplier, and a travel controller. The yaw rate detector is configured to detect a yaw rate acting on the vehicle. The front wheel suspension includes an anti-dive geometry. The rear wheel suspension includes an anti-lift geometry. The brake device is configured to independently apply a braking force to left and right front wheels of the vehicle and left and right rear wheels of the vehicle. The hydraulic pressure supplier is configured to supply a brake hydraulic pressure to the brake device. The travel controller is configured to control the brake hydraulic pressure supplied from the hydraulic pressure supplier. The left and right front wheels are steered wheels and drive wheels. The travel controller includes a deviation value calculator configured to calculate a deviation between a standard yaw rate for determining a degree of understeer during turning of the vehicle and the yaw rate detected by the yaw rate detector, and a braking force controller configured to output, to the hydraulic pressure supplier, a first signal for applying braking forces to the left and right front wheels in addition to a turning inner rear wheel when it is determined that the deviation calculated by the deviation value calculator exceeds a predetermined deviation reference value.

An aspect of the present disclosure provides a turning behavior control device for a vehicle. The turning behavior control device includes a yaw rate detector, a front wheel suspension, a rear wheel suspension, a brake device, a hydraulic pressure supplier, and a travel controller. The yaw rate detector is configured to detect a yaw rate acting on the vehicle. The front wheel suspension includes an anti-dive geometry. The rear wheel suspension includes an anti-lift geometry. The brake device is configured to independently apply a braking force to left and right front wheels of the vehicle and left and right rear wheels of the vehicle. The hydraulic pressure supplier is configured to supply a brake hydraulic pressure to the brake device. The left and right front wheels are steered wheels and drive wheels. The travel controller includes a memory that stores instructions and a processor configured to executes the instructions. The instructions cause the processor to perform calculating a deviation between a standard yaw rate for determining a degree of understeer during turning of the vehicle and the yaw rate detected by the yaw rate detector, and outputting, to the hydraulic pressure supplier, a first signal for applying braking forces to the left and right front wheels in addition to a turning inner rear wheel when the calculated deviation exceeds a predetermined deviation reference value.

BRIEF DESCRIPTION OF DRAWINGS

The accompanying drawings are included to provide a further understanding of the disclosure and are incorporated in and constitute a part of this specification. The drawings illustrate embodiments and, together with the specification, serve to describe the principles of the disclosure.

DESCRIPTION OF EMBODIMENTS

At an initial stage in which a high degree of understeer is detected, by applying a transient load movement to the on the turning inner front wheel as the drive wheel, the degree of understeer can be efficiently reduced.

However, in the technique disclosed in JP-A No. 2020-050024, when a high degree of understeer is detected, a constant braking force is continuously applied to the turning inner drive wheel, and a static load movement is generated from the turning outer drive wheel to the turning inner drive wheel, and therefore, it is difficult to efficiently reduce the degree of understeer at the initial stage. As a result, a delay occurs in the control for reducing the degree of understeer, which makes occupants including a driver uncomfortable.

The present disclosure relates to a turning behavior control device for a vehicle capable of efficiently reducing a high degree of understeer at an initial stage when understeer is detected, and capable of reducing discomfort given to occupants including a driver.

Figure 1:
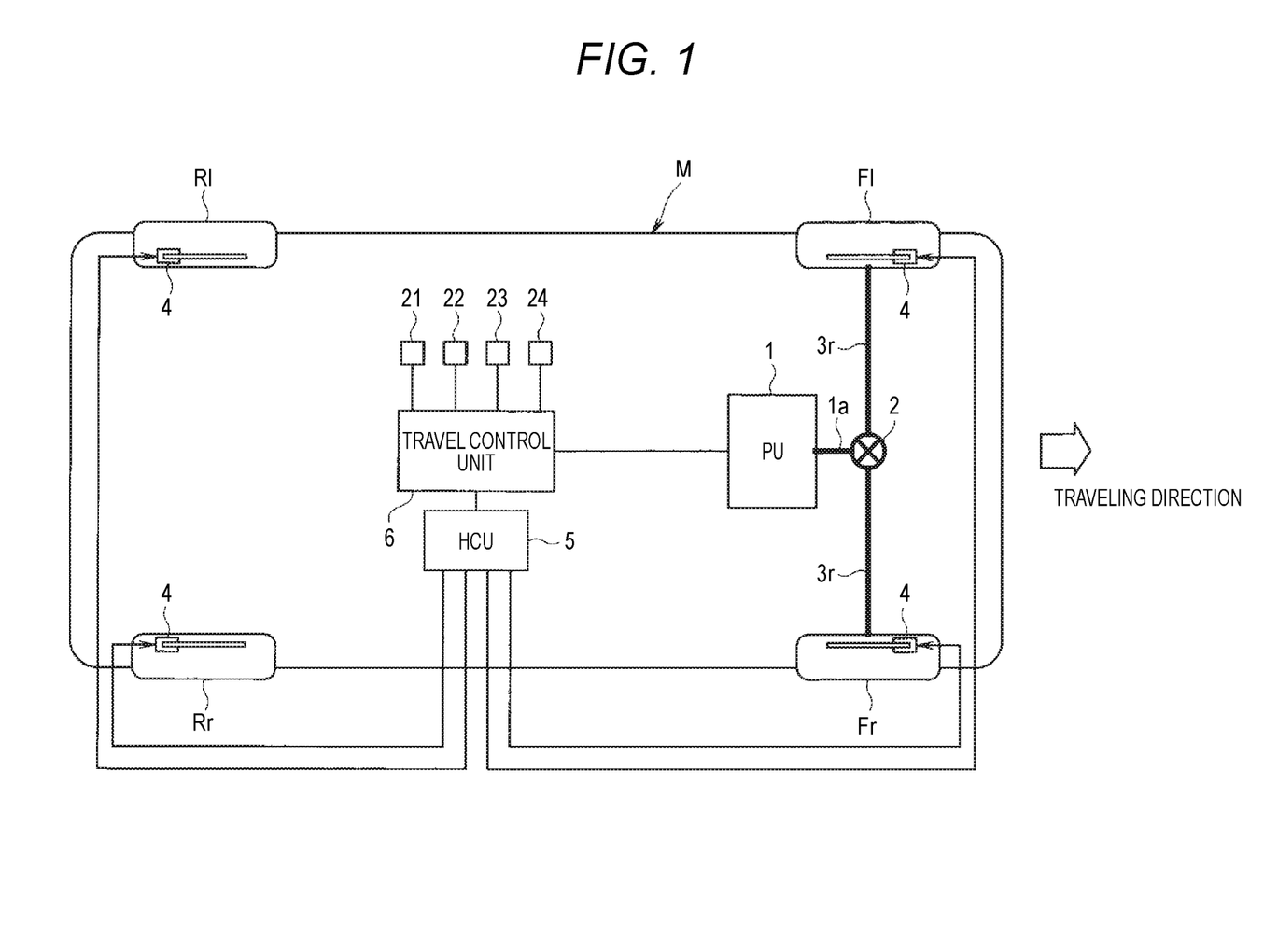
FIG. 1 is a schematic configuration diagram of a driving assistance device mounted on a vehicle.

Hereinafter, embodiments will be described with reference to the drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. A host vehicle M shown in FIG. 1 is a front-wheel drive vehicle in which front wheels Fl and Fr serve as steered wheels and drive wheels. An output shaft $1a$ of a drive source (an engine or an electric motor) 1 of the host vehicle M is connected to drive shafts $3l$ and $3r$ of the front wheels Fl and Fr via a front differential 2. As shown in FIGS. 3B, 4B, 5B, and 6B, the left and right front wheels Fl, Fr are respectively supported by left and right front wheel suspensions Fsus, and left and right rear wheels Rl, Rr are respectively supported by left and right rear wheel suspensions Rsus.

A hydraulic brake mechanism 4 is provided on each of the left and right front wheels Fl, Fr and the left and right rear wheels Rl, Rr. The hydraulic brake mechanism 4 is a known friction brake device such as a disc brake or a drum brake, and a piston of a wheel cylinder is operated by a brake hydraulic pressure supplied from a hydraulic control unit (HCU) 5 as a hydraulic pressure supplier to apply a hydraulic braking (friction braking) force. The HCU 5 includes actuators and valves such as a hydraulic pressure generating device including a booster pump, an accumulator, and the like, a pressure control valve that adjusts a hydraulic pressure at the time of brake differential and supplies the adjusted hydraulic pressure to the wheel cylinder of each of the hydraulic brake mechanisms 4, and an opening/closing control valve that opens and closes a hydraulic circuit that supplies a brake hydraulic pressure to each of the hydraulic brake mechanisms 4.

The HCU 5 is operated by a control signal from a travel control unit 6 as a travel controller. The travel control unit 6 includes a microcontroller including a CPU, a RAM, a ROM, a rewritable nonvolatile memory (flash memory or EEPROM), and peripheral devices. The ROM stores programs, fixed data, and the like necessary for the CPU to execute various types of processing. The RAM is provided as a work area of the CPU and temporarily stores various types of data in the CPU. The CPU is also called a microprocessor (MPU) or a processor. Instead of the CPU, a graphics processing unit (GPU) or a graph streaming processor (GSP) may be used. Alternatively, the CPU, the GPU, and the GSP may be selectively used in combination.

In addition to normal travel control, the travel control unit 6 has a turning behavior control function that recovers a ground contact load of a turning inner front wheel and increases a lateral force of the turning inner front wheel to reduce a degree of understeer. Sensors for detecting a driving state of the host vehicle M, such as a steering angle sensor 21 for detecting a steering angle of the left and right front wheels Fl, Fr, a vehicle speed sensor 22 for detecting a vehicle speed (host vehicle speed) of the host vehicle M, a yaw rate sensor 23 as a yaw rate detector for detecting an actual yaw rate acting on a vehicle body, and a torque sensor 24 for detecting a shaft torque acting on the output shaft $1a$ of the drive source 1, are connected to an input side of the travel control unit 6.

The turning behavior control by the travel control unit 6 is that a braking force is selectively applied to the wheels Fl, Fr, Rl, Rr according to a traveling state of the host vehicle M to reduce a degree of understeer in a case in which the degree of understeer that occurs when the host vehicle M is traveling on a curved road is high.

In this case, in the host vehicle M, in order to reduce a change in pitch attitude of the host vehicle M during braking deceleration, the front wheel suspension Fsus and the rear wheel suspension Rsus have an anti-dive geometry and an anti-lift geometry, respectively. That is, instantaneous centers of the left and right front wheels Fl, Fr suspended from a vehicle body by the left and right front wheel suspensions Fsus are set to be located above ground contact points of the left and right front wheels Fl, Fr and on a rear side of a vehicle body. Therefore, the front wheel suspensions Fsus have an anti-dive geometry. On the other hand, instantaneous centers of the left and right rear wheels Rl, Rr suspended from the vehicle body by the left and right rear wheel suspensions Rsus are set to be located above ground contact points of the left and right rear wheels Rl, Rr and on a front side of the vehicle body. Therefore, the rear wheel suspensions Rsus have an anti-lift geometry. Therefore, when a braking/driving force is applied to the wheels, a vertical force is applied from the wheels to the vehicle body.

For example, when a braking force is applied to a turning outer front wheel, an upward force is generated on a turning outer side of a front portion of the vehicle body of the host vehicle M, the roll of the vehicle body is prevented, and the ground contact load of the turning inner front wheel further increases. Conversely, when a braking force is applied to a turning outer rear wheel, a downward force is generated on a turning outer side of a rear portion of the vehicle body, and the ground contact load of the turning inner front wheel located diagonally cannot be sufficiently increased.

Figure 2:
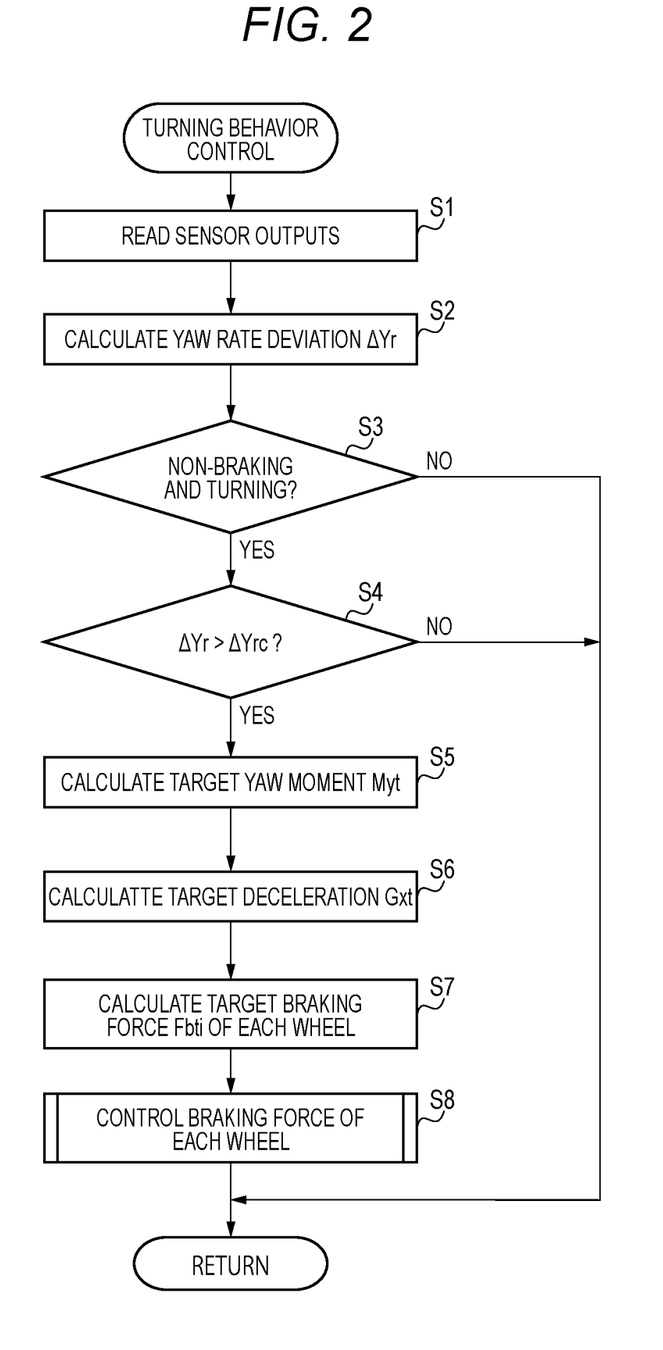
FIG. 2 is a flowchart showing a turning behavior control routine.

In one example, the turning behavior control by the travel control unit 6 is executed according to a turning behavior control routine shown in FIG. 2.

This routine is executed at every predetermined calculation cycle after the travel control unit 6 is activated. First, in step S1, sensor outputs such as the steering angle detected by the steering angle sensor 21, the host vehicle speed detected by the vehicle speed sensor 22, and the actual yaw rate detected by the yaw rate sensor 23 are read.

Next, the process proceeds to step S2, a standard yaw rate acting on the host vehicle M is calculated based on the steering angle and the host vehicle speed, and a yaw rate deviation $\Delta Yr$ is obtained based on a difference between the standard yaw rate and the actual yaw rate detected by the yaw rate sensor 23. The processing in step S2 may correspond to a deviation value calculator.

Thereafter, the process proceeds to step S3, and it is checked whether the host vehicle M is in a non-braking state and is turning. Whether the host vehicle M is in the braking state is determined based on whether a braking signal is output from the travel control unit 6 to the HCU 5. Whether the host vehicle M is turning is determined based on an output value of the yaw rate sensor 23.

When it is determined that the host vehicle M is in the non-braking state and is turning, the process proceeds to step S4. When it is determined that the host vehicle M is in the braking state or the host vehicle M is not turning, the routine is exited.

In step S4, the yaw rate deviation $\Delta Yr$ is compared with a predetermined deviation reference value Yrc. The deviation reference value Yrc is a reference value for checking whether the degree of understeer occurring in the host vehicle M is high, and is set in advance based on an experiment or the like.

When $\Delta Yr > Yrc$, it is determined that the degree of understeer is high, and the process proceeds to step S5. On the other hand, if $\Delta Yr \leq Yrc$, it is determined that a high degree of understeer is not occurred, and the routine is exited.

When the process proceeds to step S5, a target yaw moment Myt for securing the traveling stability of the host vehicle M is obtained based on the yaw rate deviation $\Delta Yr$ by referring to a map or the like. Next, the process proceeds to step S6, and a target deceleration Gxt for reducing a current yaw moment to the target yaw moment Myt is obtained.

Thereafter, the process proceeds to step S7, in which it is determined to which of the wheels Fl, Fr, Rl, and Rr a braking force is to be applied based on the target yaw moment Myt and the target deceleration Gxt, and target braking forces Fbti of the wheels Fl, Fr, Rl, and Rr to which the braking force is to be applied are obtained. Then, the process proceeds to step S8, and the travel control unit 6 controls the HCU 5 such that the wheels Fl, Fr, Rl, Rr to which the braking force is to be applied have corresponding target braking forces Fbti, and exits the routine. The processing in steps S4 to S8 may corresponding to a braking force controller.

Next, a behavior when the braking force is selectively applied to the wheels Fl, Fr, Rl, Rr will be described.

<Load Movement due to Application of Braking Force to Turning Inner Front Wheel>

Figure 3A:
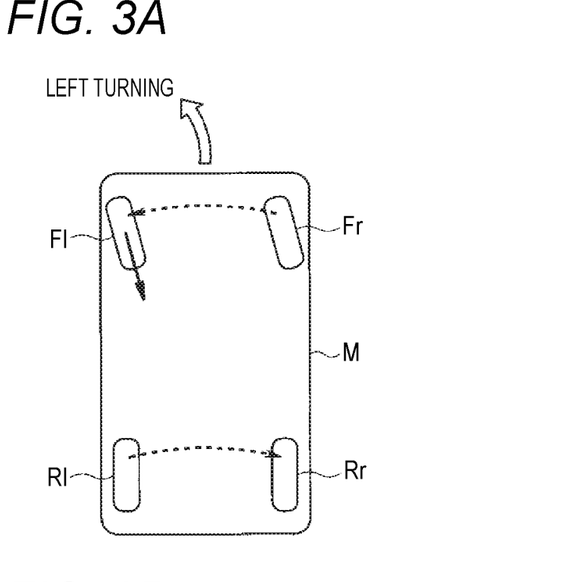
FIG. 3A is an explanatory view showing a load movement when a turning inner front wheel of a vehicle is braked.

As shown in FIG. 3A, when the wheels Fl, Fr, Rl, Rr of the host vehicle M are in a non-braking state during turning (left turning in the drawing), longitudinal forces Flf, Frf acting on the left and right front wheels Fl, Fr are the same, and longitudinal forces Rlf, Rrf acting on the left and right rear wheels Rl, Rr are the same, a constant braking force is continuously applied to a turning inner front wheel (Fl) as shown by a solid arrow.

Then, since the longitudinal forces Rlf, Rrf acting on the left and right rear wheels Rl, Rr are the same, a difference (Rlf−Rrf) remains 0. However, since the braking force is applied to the turning inner front wheel (Fl), the longitudinal forces of the left and right front wheels Fl, Fr are that a difference (Flf−Frf) between the longitudinal forces (Flf, Frf) of the turning inner front wheel (Fl) and a turning outer front wheel (Fr) is a negative value. The longitudinal forces Flf, Frf, Rlf, Rrf acting on the wheels Fl, Fr, Rl, Rr are positive values when they are driving forces and negative values when they are braking forces.

As a result, as shown by a dashed arrow in FIG. 3A, a load movement from the turning outer front wheel (Fr) to the turning inner front wheel (Fl) occurs, a ground contact load of the turning outer front wheel (Fr) decreases, and a ground contact load of the turning inner front wheel (Fl) increases. On the other hand, between the left and right rear wheels Rl and Rr, a load movement from a turning inner rear wheel (Rl) to a turning outer rear wheel (Rr) occurs as shown by a dashed arrow, a ground contact load of the turning inner rear wheel (Rl) decreases, and a ground contact load of the turning outer rear wheel (Rr) increases.

Figure 3B:
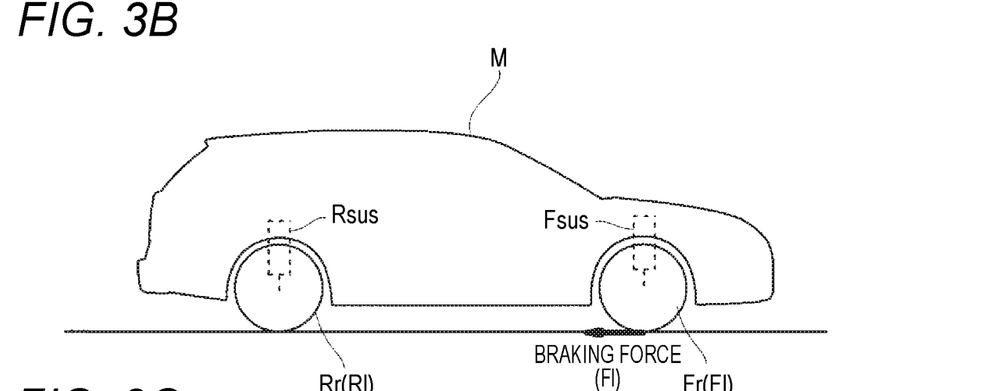
FIG. 3B is a side view showing a load movement immediately after a braking force starts to be applied to the turning inner front wheel of the vehicle.
Figure 3C:
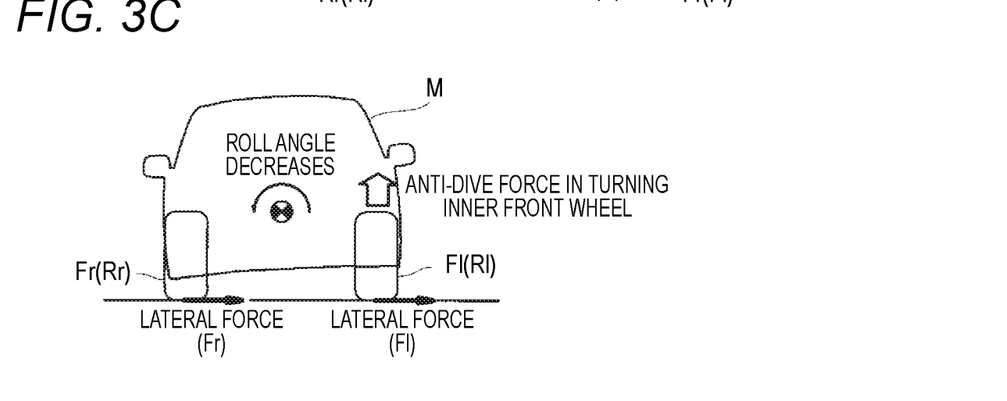
FIG. 3C is a front view showing a load movement immediately after a braking force starts to be applied to the turning inner front wheel of the vehicle.

This is a case of a static load movement in which a constant braking force is continuously applied to the turning inner front wheel (Fl), and a different behavior is shown in a transient load movement immediately (about 0.5 [sec]) after the braking force starts to be applied to the turning inner front wheel (Fl). That is, immediately after the braking force starts to be applied to the turning inner front wheel (Fl), as shown in FIGS. 3B and 3C, first, an upward anti-dive force is generated in the front wheel suspension Fsus of the turning inner front wheel (Fl) to increase a roll angle of the vehicle body. Therefore, the load movement from the turning outer front wheel (Fr) to the turning inner front wheel (Fl) temporarily decreases. Conversely, the load movement from the turning inner rear wheel (Rl) to the turning outer rear wheel (Rr) further increases.

<Load Movement Due to Application of Braking Force to Turning Inner Rear Wheel>

Figure 4A:
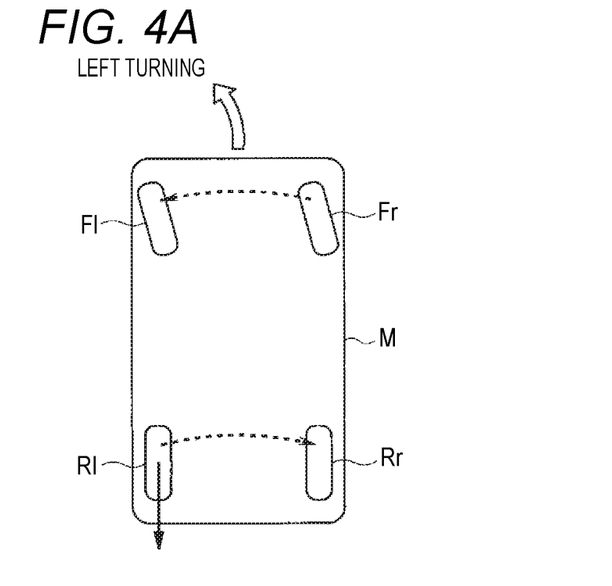
FIG. 4A is an explanatory view showing a load movement when a turning inner rear wheel of the vehicle is braked.

As shown by a solid arrow in FIG. 4A, when a constant braking force is continuously applied to the turning inner rear wheel (Rl) during turning of the host vehicle M, a load movement amount between the left and right front wheels Fl, Fr decreases, and therefore, as indicated by a dashed arrow, a load movement from the turning outer front wheel (Fr) to the turning inner front wheel (Fl) occurs. Then, the ground contact load of the turning outer front wheel (Fr) decreases, and the ground contact load of the turning inner front wheel (Fl) increases. On the other hand, since a load movement amount between the left and right rear wheels Rl, Rr increases, a load movement from the turning inner rear wheel (Rl) to the turning outer rear wheel (Rr) occurs as indicated by the dashed arrow, the ground contact load of the turning inner rear wheel (Rl) decreases, and the ground contact load of the turning outer rear wheel (Rr) increases.

Figure 4B:
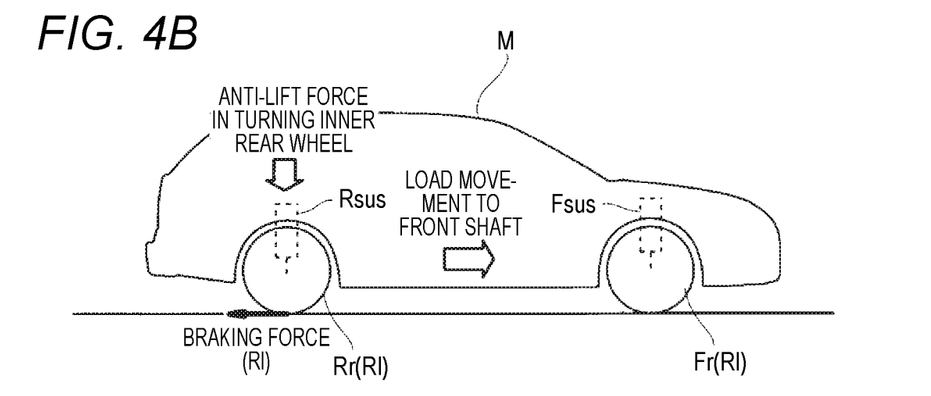
FIG. 4B is a side view showing a load movement immediately after a braking force starts to be applied to the turning inner rear wheel of the vehicle.
Figure 4C:
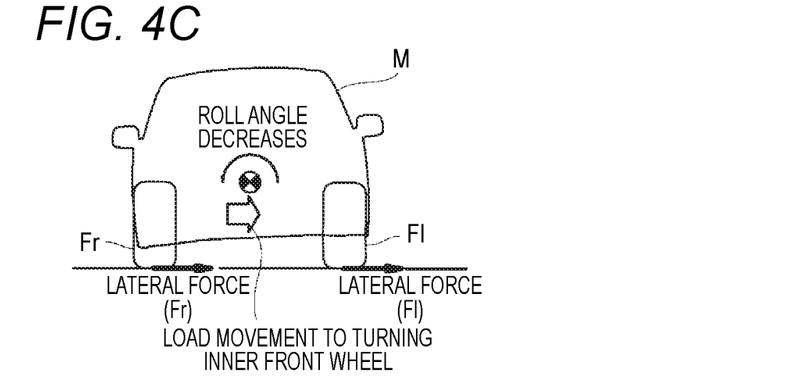
FIG. 4C is a front view showing a load movement immediately after a braking force starts to be applied to the turning inner rear wheel of the vehicle.

In this case, a transient load movement immediately after the braking force starts to be applied to the turning inner rear wheel (Rl) shows a different behavior. That is, immediately after the braking force starts to be applied to the turning inner rear wheel (Rl), as shown in FIGS. 4B and 4C, a downward anti-lift force is generated in the rear wheel suspension Rsus of the turning inner rear wheel (Rl) to decrease the roll angle of the vehicle body. As a result, a load moves to a front shaft, the load movement from the turning outer front wheel (Fr) to the turning inner front wheel (Fl) temporarily increases, and the ground contact load of the turning inner front wheel (Fl) increases. On the other hand, the load movement from the turning inner rear wheel (Rl) to the turning outer rear wheel (Rr) decreases.

<Load Movement Due to Application of Braking Force to Turning Outer Front Wheel>

Figure 5A:
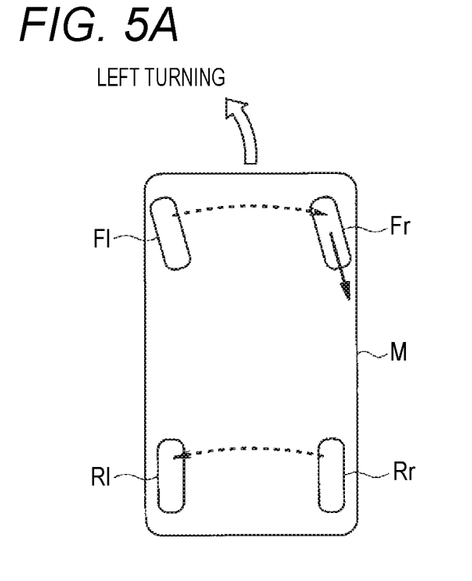
FIG. 5A is an explanatory view showing a load movement when a turning outer front wheel of the vehicle is braked.

As shown by a solid arrow in FIG. 5A, when a constant braking force is continuously applied to the turning outer front wheel (Fr), the longitudinal forces Rlf, Rrf of the left and right rear wheels Rl, Rr are the same, but the difference (Flf−Frf) between the longitudinal forces Flf, Frf of the left and right front wheels Fl, Fr is a positive value. Therefore, the load movement amount between the left and right front wheels Fl, Fr increases, and a load movement from the turning inner front wheel (Fl) to the turning outer front wheel (Fr) occurs as shown by a dashed arrow. As a result, the ground contact load of the turning inner front wheel (Fl) decreases, and the ground contact load of the turning outer front wheel (Fr) increases. On the other hand, since the load movement amount between the left and right rear wheels Rl, Rr decreases, a load movement from the turning outer rear wheel (Rr) to the turning inner rear wheel (Rl) occurs as indicated by the dashed arrow, the ground contact load of the turning outer rear wheel (Rr) decreases, and the ground contact load of the turning inner rear wheel (Rl) increases.

Figure 5B:
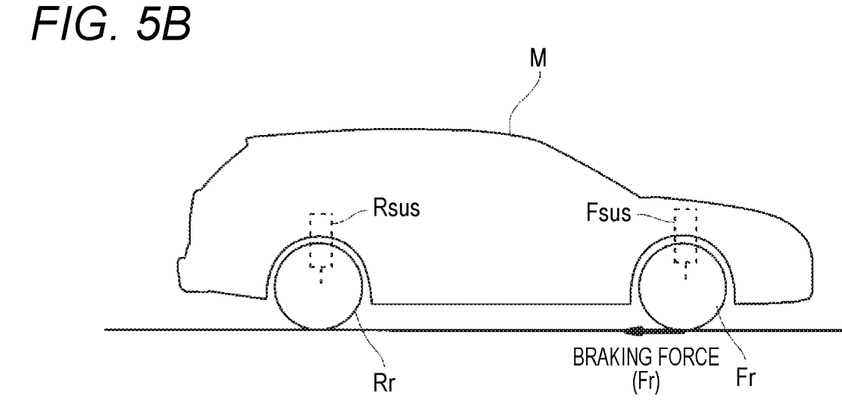
FIG. 5B is a side view showing a load movement immediately after a braking force starts to be applied to the turning outer front wheel of the vehicle.
Figure 5C:
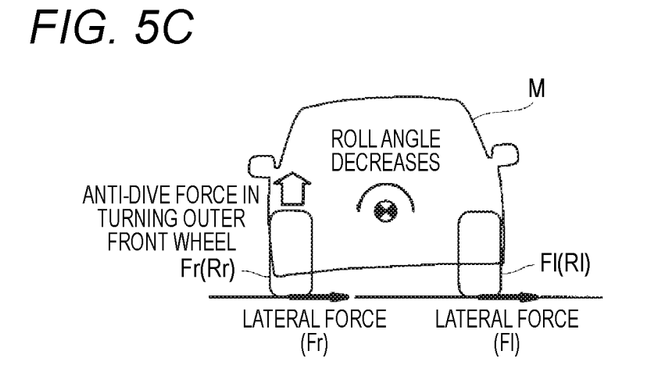
FIG. 5C is a front view showing a load movement immediately after a braking force starts to be applied to the turning outer front wheel of the vehicle.

In this case as well, a transient load movement immediately (about 0.5 [sec]) after the braking force starts to be applied to the turning outer front wheel (Fr) shows a different behavior. That is, immediately after the braking force starts to be applied to the turning outer front wheel (Fr), as shown in FIGS. 5B and 5C, an upward anti-dive force is generated in the front wheel suspension Fsus of the turning outer front wheel (Fr) to decrease the roll angle of the vehicle body. Therefore, the load movement from the turning inner front wheel (Fl) to the turning outer front wheel (Fr) temporarily decreases, and the load movement from the turning outer rear wheel (Rr) to the turning inner rear wheel (Rl) further increases.

<Load Movement Due to Application of Braking Force to Turning Outer Rear Wheel>

Figure 6A:
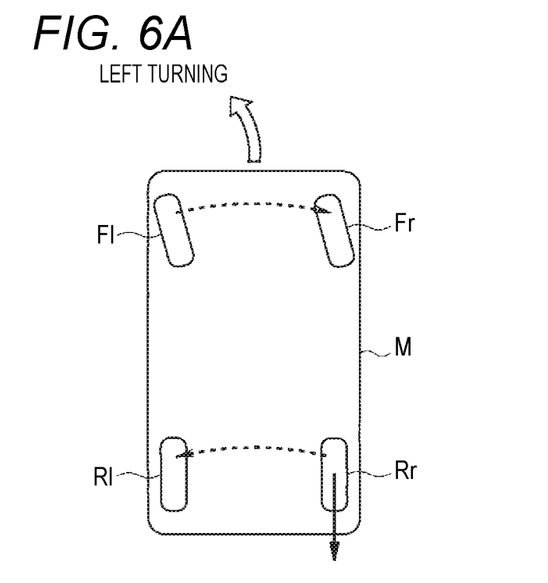
FIG. 6A is an explanatory view showing a load movement when a turning outer rear wheel of the vehicle is braked.

As shown by a solid arrow in FIG. 6A, when a constant braking force is continuously applied to the turning outer rear wheel (Rr) of the host vehicle M during turning, a difference (Rrf−Rrl) between the longitudinal force (Rrf) of the turning outer rear wheel (Rr) and the longitudinal force (Rrl) of the turning inner rear wheel (Rl) is a positive value. Therefore, the load movement amount between the left and right front wheels Fl, Fr increases, a load movement from the turning inner front wheel (Fl) to the turning outer front wheel (Fr) occurs as shown by a dashed arrow, the ground contact load of the turning inner front wheel (Fl) decreases, and the ground contact load of the turning outer front wheel (Fr) increases. On the other hand, since the load movement amount between the left and right rear wheels Rl, Rr decreases, a load movement from the turning outer rear wheel (Rr) to the turning inner rear wheel (Rl) occurs as shown by a dashed arrow, the ground contact load of the turning outer rear wheel (Rr) decreases, and the ground contact load of the turning inner rear wheel (Rl) increases.

Figure 6B:
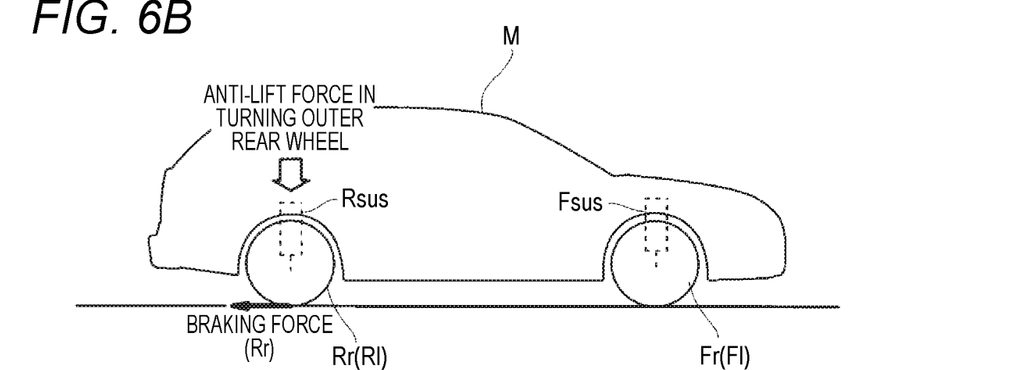
FIG. 6B is a side view showing a load movement immediately after a braking force starts to be applied to the turning outer rear wheel of the vehicle.
Figure 6C:
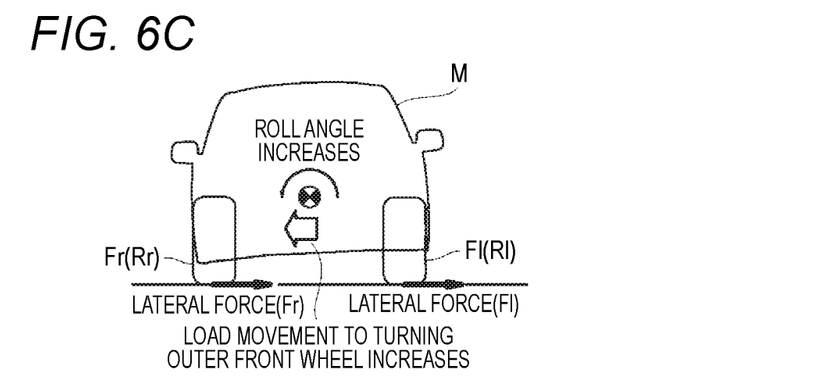
FIG. 6C is a front view showing a load movement immediately after a braking force starts to be applied to the turning outer rear wheel of the vehicle.

In this case as well, in a transient load movement immediately after the braking force starts to be applied to the turning outer rear wheel (Rr), as shown in FIGS. 6B and 6C, a downward anti-lift force is generated in the rear wheel suspension Rsus of the turning outer rear wheel (Rr) to increase the roll angle of the vehicle body. Therefore, the load movement from the turning inner front wheel (Fl) to the turning outer front wheel (Fr) temporarily increases, and the load movement from the turning outer rear wheel (Rr) to the turning inner rear wheel (Rl) decreases.

In the drawings, the left turning has been described as an example, but the load movement between the turning inner and outer wheels occurs regardless of a turning direction of the host vehicle M. Therefore, in the case of right turning, the right and left wheels are applied in reverse.

<Reduction of Degree of Understeer by Application of Braking Force>

As described above, when the turning behavior of the host vehicle M is in a state in which the degree of understeer is high, a braking force is applied to the turning inner front and rear wheels (Fl, Rl). Accordingly, it can be seen that the ground contact load of the turning inner front wheel (Fl) increases, and a resulting lateral force can cause the host vehicle M to generate a yaw moment in the turning direction.

Incidentally, in a state in which the degree of understeer is high, in particular, a lateral force of the turning inner front wheel (Fl) is insufficient compared to a necessary lateral force, and thus it is desired to maximize the load movement to the turning inner front wheel (Fl) due to deceleration of the host vehicle M caused by the application of a braking force.

Here, the load movement to the turning inner front wheel (Fl) in consideration of a transient change immediately after a braking force starts to be applied to any one of the wheels Fl, Fr, Rl, Rr is summarized in Table 1.

TABLE 1

| Wheel to which braking force is to be applied | Change in ground contact load of turning inner front wheel |
| --- | --- |
| Turning inner front wheel | Decreases once and then increases statically (small) |
| Turning inner rear wheel | Increases once and then increases statically (large) |

TABLE 1-continued

| Wheel to which braking force is to be applied | Change in ground contact load of turning inner front wheel |
|---|---|
| Turning outer front wheel | Increases once and then decreases statically (small) |
| Turning outer rear wheel | Decreases once and then decreases statically (large) |

As is clear from Table 1, the ground contact load of the turning inner front wheel (Fl) can be increased by applying a braking force to the turning inner rear wheel (Rl).

Conversely, it can be seen that the ground contact load of the turning inner front wheel (Fr) is reduced to the maximum by braking the turning outer rear wheel (Rr). Therefore, when the degree of understeer is high, as shown by a solid arrow in FIG. 7, during turning, in an initial state in which the degree of understeer is high, a braking force is applied to the turning inner rear wheel (Rl), and braking forces are also applied to the inner and outer wheels (Fl, Fr) of the front shaft. Accordingly, an appropriate deceleration is applied to the host vehicle M, and a load movement that maximally increases the ground contact load of the turning inner front wheel (Fl) can occur. Further, the lateral force of the turning inner front wheel (Fl) can be increased to efficiently reduce the degree of understeer.

In a case in which a braking force is also applied to the turning outer rear wheel (Rr) to apply deceleration to the host vehicle M, by setting the braking force smaller than that of the turning inner rear wheel (Rl), it is possible to maintain an effect of increasing the ground contact load of the turning inner front wheel (Fl) due to the deceleration.

Including a four-wheel drive vehicle, when the front wheels Fl, Fr are drive wheels, braking forces applied to the inner and outer wheels (Fl, Fr) of the front shaft cancel driving forces of the left and right front wheels, so that loads on the front wheels due to a braking/driving force can be minimized and lateral forces of the inner and outer wheels (Fl, Fr) of the front shaft can be maximized. The driving forces generated in the left and right front wheels Fl, Fr can be calculated based on a shaft torque acting on the output shaft 1a of the drive source 1 detected by the torque sensor 24.

That is, the driving force can be obtained according to: driving force=shaft torque×final reduction gear ratio×transmission efficiency/movable radius of tire. Here, if the final reduction gear ratio, the transmission efficiency, and the movable radius of tire are fixed values, the driving force is determined by a variable of the shaft torque, so that the torque sensor 24 may correspond to a driving force detector.

Further, by setting the braking forces to be applied to the inner and outer wheels (Fl, Fr) of the front shaft to be equal to or less than a maximum value in consideration of the friction of a steering system, it is possible to minimize a change in a steering force due to a braking/driving force difference between the inner and outer wheels (Fl, Fr) of the front shaft.

Incidentally, a maximum value Amax of a difference between the braking forces to be applied to the inner and outer wheels (Fl, Fr) of the front shaft is Δmax=Tfric·Gstr/|Lscr|. Here, Tfric is a friction torque of a steering system, Gstr is a steering gear ratio, and Lscr is a scrub radius.

Figure 8:
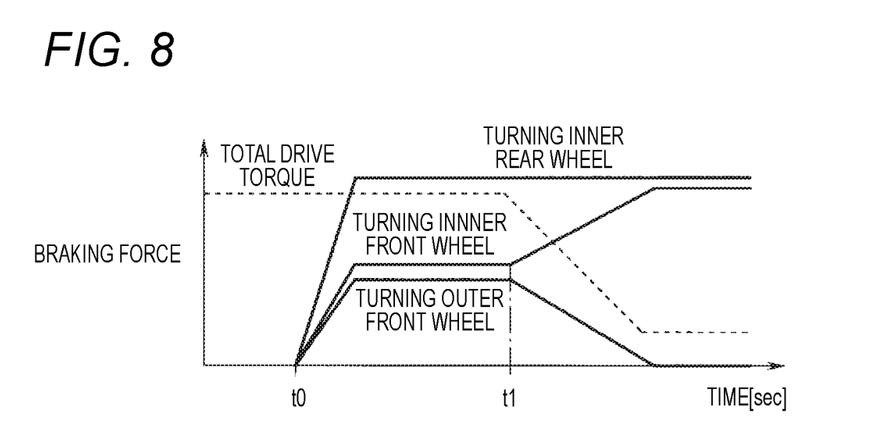
FIG. 8 is a time chart showing a braking force applied to the turning inner front and rear wheels and the turning outer front wheel immediately after a high degree of understeer is detected.

Table 1 described above is made in consideration of a transient load movement immediately after a braking force starts to be applied to any one of the wheels Fl, Fr, Rl, Rr. In this case, as shown in FIG. 8, after a predetermined time (t1) elapses from the start of braking force control (elapsed time t0), when a braking force applied to the turning outer front wheel (Fr) is decreased and a braking force applied to the turning inner front wheel (Fl) is increased, the yaw moment in the turning direction generated in the host vehicle M can be gradually increased. As a result, a total drive torque can be reduced.

Figure 9:
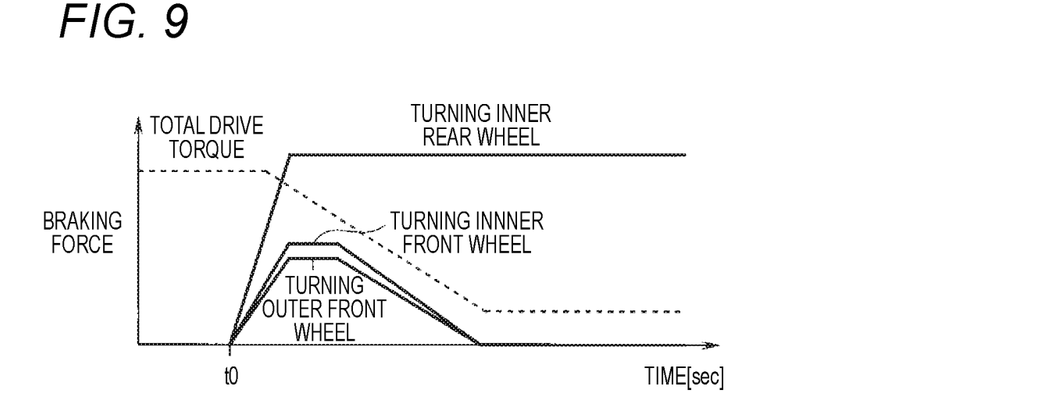
FIG. 9 is a time chart showing a braking force applied to the turning inner front and rear wheels and the turning outer front wheel in cooperation with a torque of a drive source immediately after a high degree of understeer is detected.

As shown in FIG. 9, in a case in which deceleration is applied to the host vehicle M by using total drive torque (torque down of the drive source 1) control of the travel control unit 6 in combination, braking forces applied to drive wheels (the front wheels Fl and Fr in the present embodiment) are reduced in cooperation with the control of the drive source 1. Therefore, the travel control unit 6 may correspond to a torque controller.

Then, as described with reference to FIGS. 3B and 3C, in the transient load movement immediately after a braking force starts to be applied to the turning inner front wheel (Fl), an upward anti-dive force is generated in the front wheel suspension Fsus of the turning inner front wheel (Fl) to increase the roll angle of the vehicle body. As a result, the load movement from the turning inner front wheel (Fl) to the turning outer front wheel (Fr) temporarily decreases.

Figure 7:
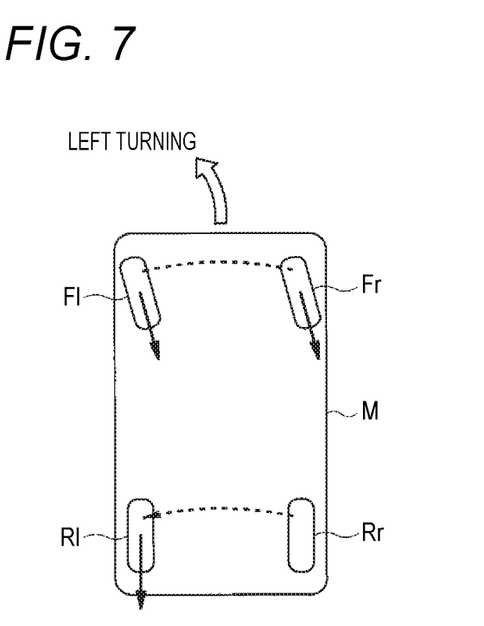
FIG. 7 is an explanatory view showing a load movement when the turning inner front and rear wheels and the turning outer front wheel of the vehicle are braked.

In order to prevent a decrease in the load movement from the turning inner front wheel (Fl) to the turning outer front wheel (Fr), a braking force is applied to the turning outer front wheel (Fr) described with reference to FIG. 5A in the transient stage immediately after braking forces start to be applied to the turning inner front and rear wheels (Fl, Rl) individually described with reference to FIGS. 3A and 4A. That is, as shown in FIG. 7, braking forces are applied to the turning inner front and rear wheels (Fl, Rl) to generate a necessary yaw moment corresponding to an understeer state of a vehicle, and a braking force is also applied to the turning outer front wheel (Fr) to give appropriate deceleration to the vehicle.

As described with reference to FIGS. 5B and 5C, since a braking force is applied to the turning outer front wheel (Fr) to reduce the roll angle of the vehicle body, and the load movement from the turning inner front wheel (Fl) to the turning outer front wheel (Fr) temporarily decreases, as shown by elapsed times t0 to t1 in FIG. 10, the turning inner front wheel (Fl) instantaneously rises, and the ground contact load of the turning inner front wheel (Fl) is temporarily increased to the maximum. As a result, it is possible to effectively correct the understeer and the swelling of a travel trajectory of a vehicle.

Figure 10:
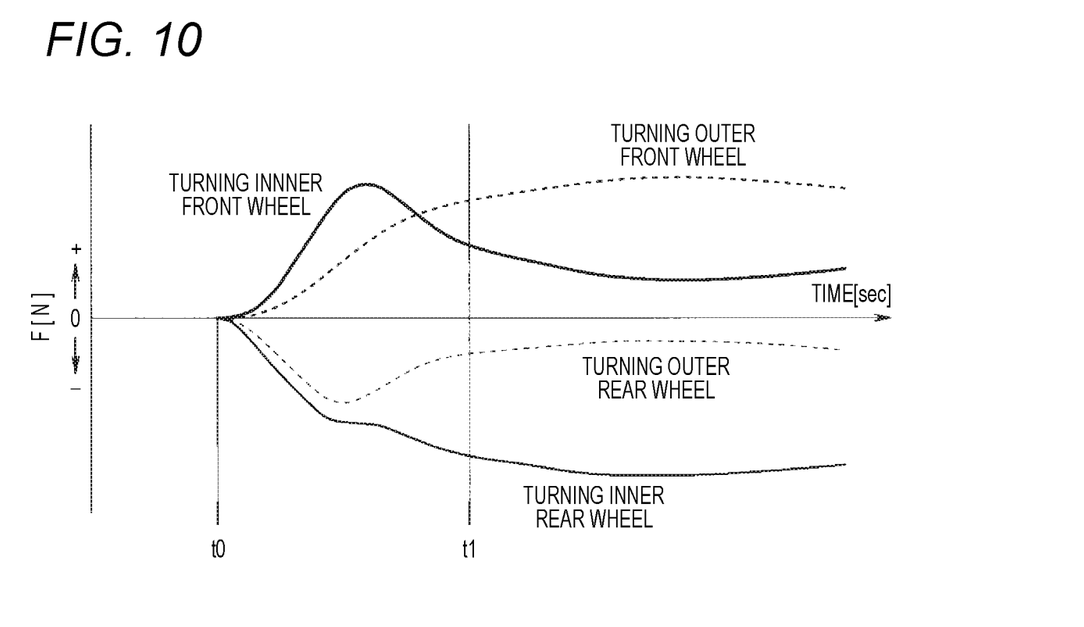
FIG. 10 is a time chart showing a change in a ground contact load of each of the wheels immediately after a high degree of understeer is detected.

The characteristics shown in FIG. 10 are characteristics when braking forces are applied to the turning inner front and rear wheels (Fl, Rl) and the turning outer front wheel (Fr). However, in the actual turning behavior control, the turning behavior control is executed only for a very short period of time t0 to t1 after a braking force is applied (0.5 [sec] in the present embodiment), and after the elapsed time t1 has elapsed, the control proceeds to the normal turning behavior control.

The mode in which a braking force is applied to the turning outer front wheel (Fr) to increase the ground contact load to the turning inner front wheel (Fl) is particularly effective when the understeer state of the host vehicle M is relatively small.

Therefore, when the degree of understeer of the host vehicle M does not decrease or is high even though such control is executed, the application of the braking force to the turning outer front wheel (Fr) is immediately stopped. Then, the control is switched to the application of braking forces only to the turning inner front and rear wheels Fl, Rl, and the control is shifted to generate a maximum yaw moment and reduce an overall driving force.

As described above, according to embodiments, by applying braking forces to left and right wheels of a front shaft in addition to a turning inner rear wheel, when a high degree of understeer is detected, it is possible to generate a necessary yaw moment in a turning direction in the host vehicle M, to maximally increase a ground contact load of a turning inner front wheel, and to effectively correct the understeer acting on the host vehicle M and the swelling of a travel trajectory. As a result, it is possible to efficiently reduce the high degree of understeer at an initial stage, and it is possible to reduce discomfort given to occupants including a driver.

Further, by making the braking forces applied to the left and right wheels of the front shaft substantially equal to a driving force, cornering forces of the front shaft wheels can be maximized, and the fluctuation of a steering force can be minimized.

The present disclosure is not limited to the embodiment described above, and can be applied to, for example, a hybrid vehicle in which drive sources, an engine and an electric motor are selectively driven or both the engine and the electric motor are driven.

What is claimed is:

1. A turning behavior control device for a vehicle, the turning behavior control device comprising:
    a yaw rate detector configured to detect a yaw rate of the vehicle;
    a front wheel suspension having an anti-dive geometry;
    a rear wheel suspension having an anti-lift geometry;
    a brake device configured to independently apply a braking force to left and right front wheels of the vehicle and left and right rear wheels of the vehicle;
    a hydraulic pressure supplier configured to supply a brake hydraulic pressure to the brake device; and
    a travel controller, wherein the left and right front wheels are steered wheels and drive wheels,
    the travel controller comprises a memory that stores instructions and a processor configured to execute the instructions,
    the instructions cause the processor to perform:
    calculating a deviation between a standard yaw rate for determining a degree of understeer during turning of the vehicle and the yaw rate detected by the yaw rate detector; and
    when the calculated deviation exceeds a predetermined deviation reference value, executing a turning behavior control comprising:
        outputting, to the hydraulic pressure supplier, a first signal for applying braking forces to only three wheels including the left and right front wheels and to a turning inner rear wheel and excluding a turning outer rear wheel,
        the hydraulic pressure supplier is configured to, in response to receiving the first signal, supply the brake hydraulic pressure to the brake device, and
        in response to the brake hydraulic pressure being supplied to the brake device, the brake device applies the braking forces to only the three wheels including the left and right front wheels and the turning inner rear wheel and excluding the turning outer rear wheel,
        after expiration of a predetermined period of time, ending the turning behavior control.

2. The turning behavior control device for a vehicle according to claim 1, further comprising:
    a driving force detector configured to detect a driving force acting on the vehicle, wherein the braking force controller is further configured to output, to the hydraulic pressure supplier, a second signal for applying the braking forces for canceling the driving force detected by the driving force detector to the left and right front wheels.

3. The turning behavior control device for a vehicle according to claim 1, wherein the braking force controller is further configured to
    redetecting the yaw rate of the vehicle;
    calculate a deviation between the standard yaw rate and the redetected yaw rate;
    in a case where the calculated deviation between the standard yaw rate and the redetected yaw rate, output, to the hydraulic pressure supplier, a third signal for applying a braking force to only a turning inner rear wheel after the predetermined time elapses.

4. The turning behavior control device for a vehicle according to claim 1, wherein the braking force controller is further configured to output, to the hydraulic pressure supplier, the fourth signal for applying the braking forces onlyto the turning inner front and rear wheels after a predetermined time elapses since the first signal is output to the hydraulic pressure supplier.

5. The turning behavior control device for a vehicle according to claim 1, wherein the braking force controller is further configured to
    redetecting the yaw rate of the vehicle;
    calculate a deviation between the standard yaw rate and the redetected yaw rate;
    in a case where the calculated deviation between the standard yaw rate and the redetected yaw rate, output, to the hydraulic pressure supplier, a third signal for applying a braking force to only a turning inner front and rear wheel wheels after the predetermined time elapses.

6. The turning behavior control device for a vehicle according to claim 5, wherein
    the travel controller further includes a torque controller configured to control a drive torque of a drive source, and
    the torque controller is further configured to decrease the drive torque of the drive source after the braking force controller outputs the third signal to the hydraulic pressure supplier.

7. The turning behavior control device for a vehicle according to claim 1, wherein the braking force controller is further configured to output, to the hydraulic pressure supplier, a fourth signal for applying the braking forces only to the turning inner front and rear wheels after the predetermined time elapses since the first signal is output to the hydraulic pressure supplier.

8. The turning behavior control device for a vehicle according to claim 7, wherein
    the travel controller further includes a torque controller configured to control a drive torque of a drive source, and
    the torque controller is further configured to decrease the drive torque of the drive source after the braking force controller outputs the fourth signal to the hydraulic pressure supplier.

9. The turning behavior control device for a vehicle according to claim 1, wherein, in response to the braking forces being applied to at least one of the three wheels including the left and right front wheels and the turning inner rear wheel, i) a ground contact load of the turning inner front wheel increases to a maximum value for the predetermined period of time and decreases after the predetermined period elapses, ii) a ground contact load of the turning outer front wheel increases during the predetermined period of time and then decreases after the predetermined period of time elapses, and iii) a ground contact load of the turning outer rear wheel decreases during the predetermined period of time and continues to decrease after the predetermined period of time elapses.

\* \* \* \* \*